W. S. DOUGHTY.
Sprinkler.

No. 202,334. Patented April 16, 1878.

WITNESSES:
Chas. H. Kimball
William Henry Clifford

INVENTOR:
Walter S. Doughty

UNITED STATES PATENT OFFICE.

WALTER S. DOUGHTY, OF CAPE ELIZABETH, MAINE.

IMPROVEMENT IN SPRINKLERS.

Specification forming part of Letters Patent No. 202,334, dated April 16, 1878; application filed February 13, 1878.

*To all whom it may concern:*

Be it known that I, WALTER S. DOUGHTY, of Cape Elizabeth, in the county of Cumberland and State of Maine, have invented certain new and useful Improvements in Sprinklers; and I do hereby declare that the following is a full, clear, and exact description thereof, which will enable others skilled in the art to which it appertains to make and use the same, reference being had to the accompanying drawings, and to letters of reference marked thereon, which form a part of this specification.

Figure 1:
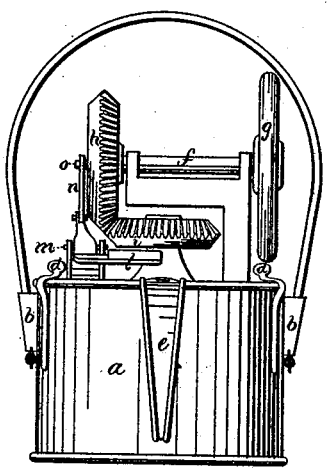
Figure 2:
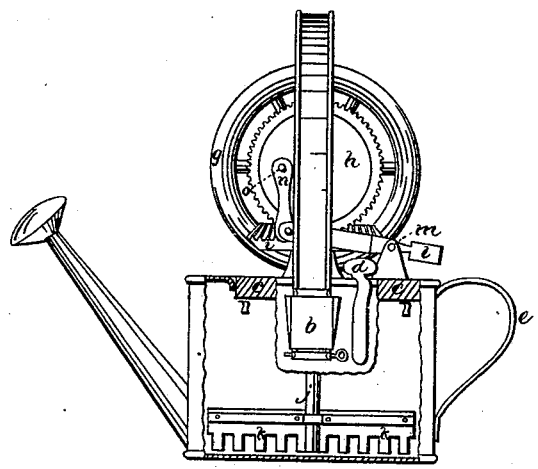

Figure 1 is an elevation. Fig. 2 is an elevation with parts broken out.

Same letters show like parts.

My invention relates to a device for sprinkling paris-green and other such poisons onto plants, to kill and prevent the accumulation of bugs and destructive insects.

$a$ shows an ordinary watering-pot, with its bail and nozzle. The bail is removable, as illustrated at $b$. Into the top I set a piece, $c$, filling the aperture thereof, or capable of being held therein, and fastened and held down in place by springs $d$. $e$ is the handle of the pot. On the piece $c$, I support, by proper means, a shaft, $f$, balance-wheel $g$, and two beveled gears, $h\ i$. $h$ revolves in a vertical, and $i$ in a horizontal, plane. $i$ is rigidly set on a vertical shaft, $j$, extending down into the pot, and carrying, attached to its lower end, the mixer or agitator $k$. $l$ is a thumb-lever, pivoted at $m$, working the link $n$, and connected to the gear $h$ on the pin $o$.

The handle $e$ being grasped by the hand, the lever $l$ is worked by the thumb upwardly and downwardly. Thus the requisite revolution within the pot is given, through the gears and other devices named, to the agitator $k$. At the same time the mixture, thus kept in a proper state within the pot, can be poured from the nozzle and scattered upon the vegetables as desired.

It will be seen that the piece $c$, with its accompanying devices, is removable from the pot.

I claim as my invention and desire to secure by Letters Patent—

In combination with a watering-pot of ordinary construction, or any similar vessel, the piece $c$, shaft $f$, gears $h\ i$, shaft $j$, agitator $k$, $k$, thumb-lever $l$, and link $n$, to operate as herein set forth.

In testimony that I claim the foregoing as my own I affix my signature in presence of two witnesses.

WALTER S. DOUGHTY.

Witnesses:
 WILLIAM HENRY CLIFFORD,
 CHAS. H. KIMBALL.